United States Patent
Gustavsson et al.

(10) Patent No.: US 9,250,136 B1
(45) Date of Patent: Feb. 2, 2016

(54) HYPERSPECTRAL IMAGING SYSTEM FOR PYROMETRY APPLICATIONS AND METHOD OF OPERATING THE SAME

(71) Applicant: General Electric Company, Schenectady, NY (US)

(72) Inventors: Jonas Patrik Richard Gustavsson, Niskayuna, NY (US); Vivek Venugopal Badami, Ipswich, MA (US); Nilesh Tralshawala, Rexford, NY (US); Jordi Estevadeordal, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/473,210

(22) Filed: Aug. 29, 2014

(51) Int. Cl.
*G01J 5/08* (2006.01)
*G01J 5/60* (2006.01)
*G02B 13/14* (2006.01)
*G02B 27/10* (2006.01)
*G01J 5/00* (2006.01)
*G01J 5/50* (2006.01)
*G01J 5/20* (2006.01)

(52) U.S. Cl.
CPC .............. *G01J 5/60* (2013.01); *G01J 5/0022* (2013.01); *G01J 5/0088* (2013.01); *G01J 5/0806* (2013.01); *G01J 5/0831* (2013.01); *G01J 5/20* (2013.01); *G01J 5/505* (2013.01); *G02B 13/14* (2013.01); *G02B 27/1013* (2013.01); *G01J 2005/0077* (2013.01); *G01J 2005/202* (2013.01); *G01J 2005/607* (2013.01)

(58) Field of Classification Search
CPC ............ G01J 3/108; G01J 5/0088; G01J 5/08

USPC .................................................... 250/339.02
See application file for complete search history.

(56) References Cited

U.S. PATENT DOCUMENTS

| | | | |
|---|---|---|---|
| 5,822,222 A | 10/1998 | Kaplinsky et al. | |
| 6,122,051 A * | 9/2000 | Ansley et al. | 356/326 |
| 6,355,930 B1 * | 3/2002 | Sivathanu et al. | 250/339.02 |
| 6,367,969 B1 | 4/2002 | Ringermacher et al. | |
| 6,422,743 B1 | 7/2002 | Nirmalan et al. | |
| 6,819,798 B2 | 11/2004 | Gorin | |
| 7,186,978 B2 | 3/2007 | Bevan et al. | |
| 7,609,381 B2 | 10/2009 | Warren | |

(Continued)

OTHER PUBLICATIONS

Estevadeordal, Jordi et al., Multi-Color Techniques for Identification and Filtering of Burst Signals in Jet Engine Pyrometers, GT2012, Proceedings of ASME Turbo Expo 2012: Power for Land, Sea and Air, Jun. 11-15, 2012, GT2012-69614.

*Primary Examiner* — Marcus Taningco
(74) *Attorney, Agent, or Firm* — Ann M. Agosti

(57) ABSTRACT

A pyrometry imaging system for monitoring a high-temperature asset which includes at least one component is provided. The system includes a lens element in optical communication with the at least one component. The lens element is configured to receive at least a portion of thermal radiation emitted from the at least one component. The system also includes a view limiting device positioned between the lens element and a dispersive element. The dispersive element is configured to split the at least a portion of thermal radiation emitted into a plurality of wavelengths. The system further includes at least one camera device in optical communication with the dispersive element. The at least one camera device is configured to receive at least one wavelength from the dispersive element.

15 Claims, 8 Drawing Sheets

(56) References Cited

U.S. PATENT DOCUMENTS

| | | | |
|---|---|---|---|
| 7,633,066 B2* | 12/2009 | Antel et al. | 250/339.02 |
| 7,887,234 B2 | 2/2011 | Jonnalagadda et al. | |
| 8,305,575 B1* | 11/2012 | Goldstein et al. | 356/326 |
| 2008/0285027 A1* | 11/2008 | Lanoue | 356/302 |
| 2011/0240858 A1* | 10/2011 | Estevadeordal et al. | 250/338.3 |
| 2012/0101769 A1* | 4/2012 | Zombo et al. | 702/135 |
| 2012/0200698 A1 | 8/2012 | Baleine et al. | |
| 2014/0354868 A1* | 12/2014 | Desmarais et al. | 348/333.01 |

\* cited by examiner

HYPERSPECTRAL IMAGING SYSTEM FOR PYROMETRY APPLICATIONS AND METHOD OF OPERATING THE SAME

BACKGROUND

The field of the disclosure relates generally to component surface temperature measurement, and more specifically, to methods and a system for measuring component surface temperature in harsh environments based on hyperspectral imaging.

At least some known turbomachines, such as gas turbine engines, include a plurality of rotating turbine blades or buckets that channel high-temperature fluids, i.e., combustion gases, through the gas turbine engines. Known turbine buckets are typically coupled to a wheel portion of a rotor within the gas turbine engine and cooperate with the rotor to form a turbine section. The turbine buckets are typically spaced circumferentially in a row extending about the rotor. Moreover, known turbine buckets are arranged in axially-spaced rows that are separated by a plurality of stationary nozzle segments that channel the fluid flowing through the engine towards each subsequent row of rotating buckets. Each row of nozzle segments, in conjunction with an associated row of turbine buckets, is usually referred to as a turbine stage and most known turbine engines include a plurality of turbine stages. The arrangement of turbine buckets and nozzle segments is referred to as a hot gas path.

Such known turbine buckets and nozzle segments in the hot gas path may wear over time. For example, such components may exhibit stress-related cracking induced by temperatures at or above predetermined parameters. Furthermore, coatings are applied to such components to protect the components from temperatures of the hot gas path. Therefore, many known gas turbine engines include temperature monitoring systems that provide operational temperature data in real time, i.e., at the time of measurement. At least some of these known temperature monitoring systems monitor and record temperature data as an input to adjust operation, e.g., the firing rate of the gas turbine engine, i.e., the rate or ratio of fuel and air being combusted in the engine. In some cases, the temperature data may be used as an input into certain protective features of the engine.

A key challenge in the conversion from intensities to surface temperatures in gas turbine measurements is to separate the contributions from different sources in each point. Generally, the balance will vary over both time and over a given surface due to, for example, fouling and wear of surface and optics, and run conditions. Another key challenge is the measurement of the gas temperature in front of the blade/bucket. Another challenge in collecting thermal data from the surface of components of an asset while the asset is operating at high-temperatures is due to nature of the environment that the components are operating in. Impurities, such as soot and hot vapors, may also interfere with readings.

BRIEF DESCRIPTION

In one aspect, a pyrometry imaging system for monitoring a high-temperature asset which includes at least one component is provided. The system includes a lens element in optical communication with the at least one component. The lens element is configured to receive at least a portion of thermal radiation emitted from a plurality of thermal points of the at least one component of the high-temperature asset. Each thermal point of the plurality of thermal points defines a section of the at least one component. The system also includes a view limiting device in optical communication with the lens element and a dispersive element in optical communication with the lens element through the view limiting device. The view limiting device is positioned between the lens element and the dispersive element. The dispersive element is configured to split the at least a portion of thermal radiation emitted into a plurality of wavelength points for each of the plurality of thermal points. Each wavelength point of the plurality of wavelength points represents a wavelength of the at least a portion of thermal radiation emitted from the corresponding thermal point. The system further includes at least one camera device in optical communication with the dispersive element. The at least one camera device is configured to receive at least one wavelength point of the plurality of wavelength points from said dispersive element.

In a further aspect, a method for operating a pyrometry imaging system for monitoring a high-temperature asset which includes at least one component is provided. The method includes receiving, by a lens element, a portion of thermal radiation emitted from a plurality of thermal points of the at least one component of the high-temperature asset. Each thermal point of the plurality of thermal points defines a section of the at least one component. The method also includes transmitting, from the lens element, the portion of thermal radiation emitted through a view limiting device to a dispersive element. The method further includes splitting, by the dispersive element, the portion of thermal radiation emitted into a plurality of wavelength points for each of the received thermal points. Each wavelength point of the plurality of wavelength points represents a wavelength of the portion of thermal radiation emitted from the corresponding thermal point. The method also includes transmitting, by the dispersive element, at least one wavelength point of the plurality of wavelength points to at least one camera device. The method further includes generating, at the at least one camera device, signals substantially representative of the at least one wavelength point.

In another aspect, a high-temperature asset defining at least one high-temperature region is provided. The asset includes at least one component positioned in the high-temperature region of the high-temperature asset and a pyrometry imaging system. The pyrometry imaging system includes a lens element in optical communication with the at least one component of the high-temperature asset. The lens element is configured to receive at least a portion of thermal radiation emitted from a plurality of thermal points from the at least one component of the high-temperature asset. Each wavelength point represents a wavelength of the thermal radiation emitted from the corresponding thermal point. The pyrometry imaging system also includes a view limiting device in optical communication with the lens element and a dispersive element in optical communication with the lens element through the view limiting device. The view limiting device is positioned between the lens element and the dispersive element. The dispersive element is configured to split the portion of received thermal radiation into a plurality of wavelength points for each of the plurality of thermal points. Each wavelength point represents a wavelength of the thermal radiation emitted from the corresponding thermal point. The pyrometry imaging system further includes at least one camera device in optical communication with the dispersive element. The at least one camera device is configured to receive at least one wavelength point corresponding to at least one wavelength from the dispersive element.

DRAWINGS

These and other features, aspects, and advantages of the present disclosure will become better understood when the following detailed description is read with reference to the accompanying drawings in which like characters represent like parts throughout the drawings, wherein.

Figure 1:
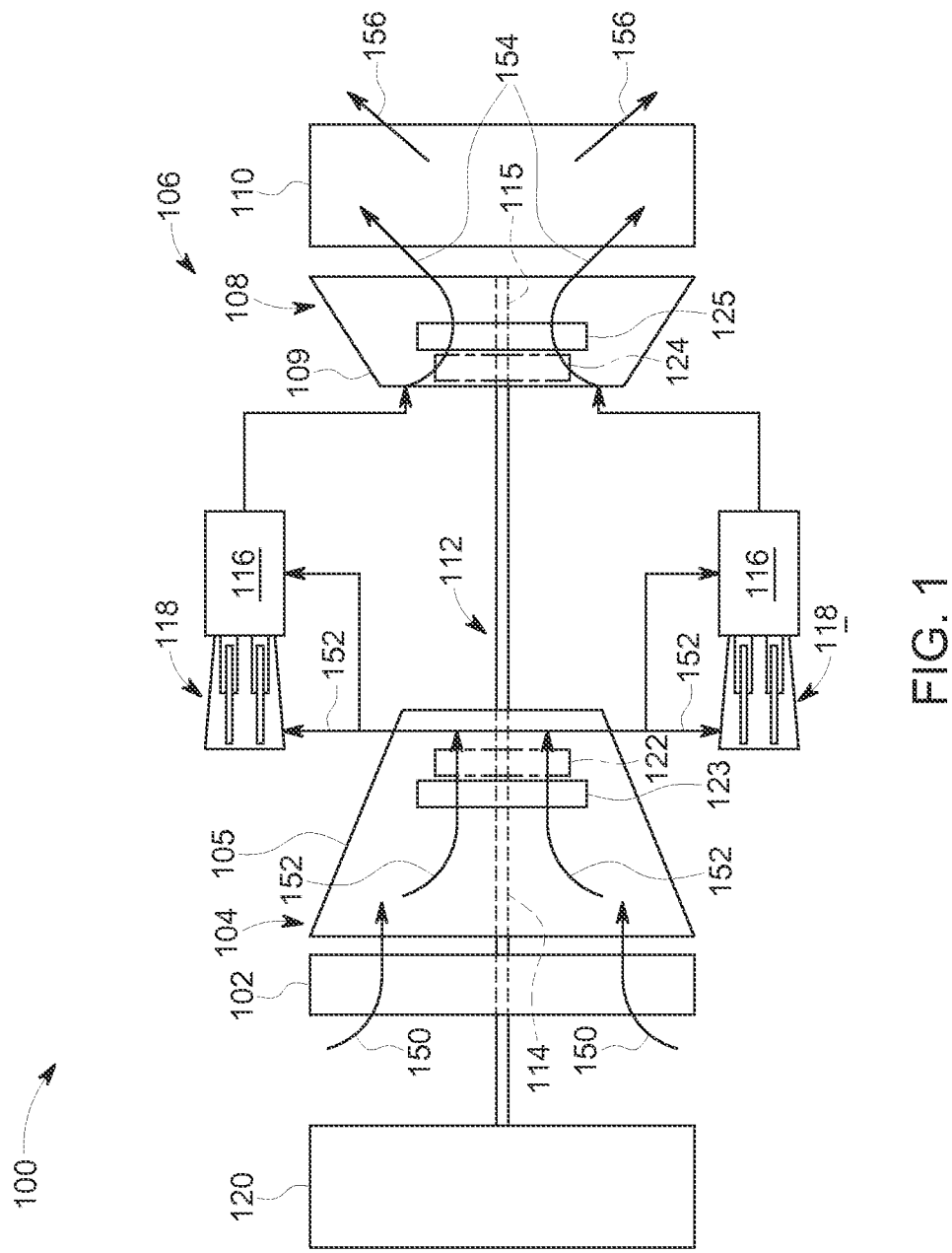
FIG. 1 is a schematic view of a high-temperature asset, i.e., a turbomachine, and more specifically, in the exemplary embodiment, a gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and interchanged, such ranges are identified and include all the sub-ranges contained therein unless context or language indicates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The hyperspectral imaging systems as described herein provide a cost-effective method for increasing reliability and decreasing disruptions of operation of gas turbine engines and other high-temperature systems. Specifically, the hyperspectral imaging systems described herein receive photons representative of the thermal radiation emitted in one a line from a component in a high-temperature area of a high-temperature asset. Also, the hyperspectral imaging systems described herein divide the photons into ranges of wavelengths. Further, the hyperspectral imaging systems described herein compile the photons from the different wavelengths into a thermal image showing the wavelengths of the radiation emitted from the component. The hyperspectral imaging system compiles the thermal image into a two-dimensional image, that shows the line in one dimension and the wavelengths emitted in the other dimension. Moreover, the hyperspectral imaging systems described herein analyze the thermal image to determine the surface temperature of the component. In addition, the hyperspectral imaging systems described herein also use the thermal image and the determined temperatures to determine the emissivity and the status of a thermal coating on the component. Furthermore, the hyperspectral imaging systems described herein are configured so that the natural movement of the component will allow the system to scan multiple continuous linear sections of the component. Also, the hyperspectral imaging systems described herein may also be configured to scan a non-moving component.

FIG. 1 is a schematic view of a high-temperature asset, i.e., a turbomachine, and more specifically, in the exemplary embodiment, a gas turbine engine 100. Alternatively, any high-temperature apparatus, system, and facility may be monitored and controlled using a system substantially similar to the hyperspectral imaging system (none shown in FIG. 1) as described herein, including, without limitation, combustion systems such as fossil-fired furnaces, gasification systems, boilers, steam turbines, and the associated high-temperature exhaust systems.

In the exemplary embodiment, gas turbine engine 100 includes an air intake section 102, and a compressor section 104 that is coupled downstream from, and in flow communication with, intake section 102. Compressor section 104 is enclosed within a compressor casing 105. A combustor section 106 is coupled downstream from, and in flow communication with, compressor section 104, and a turbine section 108 is coupled downstream from, and in flow communication with, combustor section 106. Gas turbine engine 100 is enclosed within a turbine casing 109 and includes an exhaust section 110 that is downstream from turbine section 108. Moreover, in the exemplary embodiment, turbine section 108 is coupled to compressor section 104 via a rotor assembly 112 that includes, without limitation, a compressor rotor, or drive shaft 114 and a turbine rotor, or drive shaft 115.

In the exemplary embodiment, combustor section 106 includes a plurality of combustor assemblies, i.e., combustors 116 that are each coupled in flow communication with compressor section 104. Combustor section 106 also includes at least one fuel nozzle assembly 118. Each combustor 116 is in flow communication with at least one fuel nozzle assembly 118. Moreover, in the exemplary embodiment, turbine section 108 and compressor section 104 are rotatably coupled to a load 120 via drive shaft 114. For example, load 120 may include, without limitation, an electrical generator or a mechanical drive application, e.g., a pump. Alternatively, gas turbine engine 100 may be an aircraft engine. In the exemplary embodiment, compressor section 104 includes at least one compressor blade assembly 122, i.e., blade 122 and at least one adjacent stationary vane assembly 123.

Also, in the exemplary embodiment, turbine section 108 includes at least one turbine blade assembly, i.e., bucket 124 and at least one adjacent stationary nozzle assembly 125. Each compressor blade assembly and each turbine bucket 124 are coupled to rotor assembly 112, or, more specifically, compressor drive shaft 114 and turbine drive shaft 115.

In operation, air intake section 102 channels air 150 towards compressor section 104. Compressor section 104 compresses inlet air 150 to higher pressures and temperatures prior to discharging compressed air 152 towards combustor section 106. Compressed air 152 is channeled to fuel nozzle assembly 118, mixed with fuel (not shown), and burned within each combustor 116 to generate combustion gases 154 that are channeled downstream towards turbine section 108. Combustion gases 154 generated within combustors 116 are channeled downstream towards turbine section 108. After impinging turbine bucket 124, thermal energy is converted to mechanical rotational energy that is used to drive rotor assembly 112. Turbine section 108 drives compressor section 104 and load 120 via drive shafts 114 and 115, and exhaust gases 156 are discharged through exhaust section 110 to ambient atmosphere.

Figure 2:
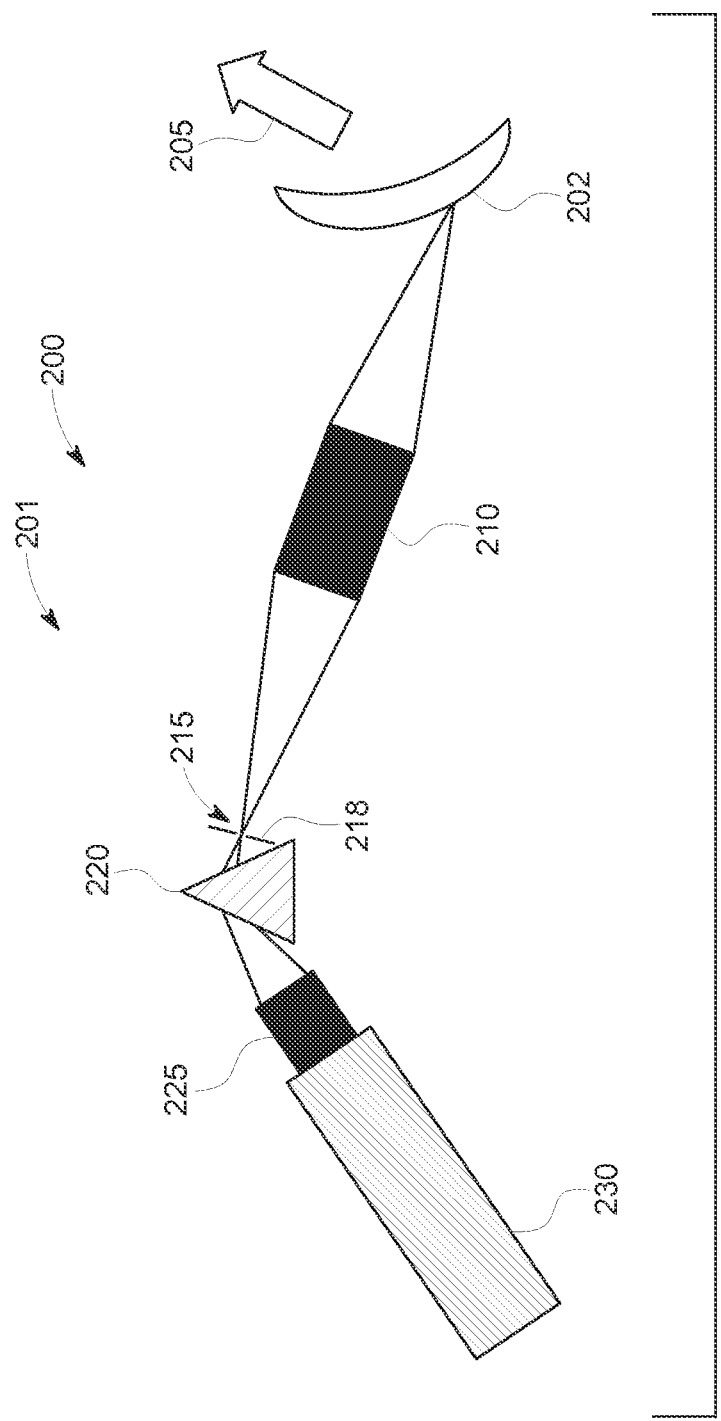
FIG. 2 is a schematic top view of an exemplary optical system for a hyperspectral imaging system that may be used with the gas turbine engine shown in FIG. 1.

FIG. 2 is a schematic top view of an exemplary optical system 200 for a hyperspectral imaging system 201 that may be used with the gas turbine engine 100 shown in FIG. 1. Hyperspectral imaging system 201 includes optical system 200. Optical system 200 includes a lens element 210 in optical communication with a moving component 202. Optical system 200 also includes a view limiting device 215 and a dispersive element 220 which is in optical communication with lens element 210 through view limiting device 215. Optical system further includes a camera lens 225 and a camera 230, which are in optical communication with dispersive element 220.

In the exemplary embodiment, optical system 200 scans moving component 202. In some embodiments, moving component 202 could be compressor blade assembly 122 or turbine bucket 124 (both shown in FIG. 1). While in operation, moving component 202 emits thermal radiation. As moving component 202 travels past lens element 210 in a direction 205, lens element 210 receives photons representative of the thermal radiation emitted from a portion of moving component 202. Lens element 210 focuses the photons and transmits the photons through view limiting device 215, which is positioned in a wall 218 of the high-temperature asset, to a dispersive element 220. In some embodiments, wall 218 is one of compressor casing 105 or turbine casing 109 (both shown in FIG. 1).

In the exemplary embodiment, view limiting device 215 is a linear slit which allows photons to pass through wall 218. In other embodiments, view limiting device 215 is, for example, without limitation, a sight tube, a fiber tube, or a linear bundle either used in concert with a slit or other limiting device. View limiting device 215 is configured to limit the photons that pass from lens element 210 to dispersive element 220 to limit the thermal radiation viewed. As a linear slit, view limiting device 215 limits the photons that pass from lens element 210 to dispersive element 220 to those that represent thermal radiation from a linear segment of moving component 202. The linear segment comprises a plurality of thermal points where each thermal point defines a section of the linear segment. View limiting device 215 further serves to block radiation emitted from parts of the engine away from the line being studied. In some embodiments, view limiting device 215 is independent from lens element 210 and any viewing port used. Examples of dispersive element 220 include, but are not limited to, a prism or a diffraction grating.

Dispersive element 220 divides the photons by wavelength. For each thermal point, dispersive element 220 divides the photons from that thermal point by wavelength into a plurality of wavelength points, where each wavelength point represents the thermal point at a different wavelength. Dispersive element 220 transmits the photons to camera lens 225. In the exemplary embodiment, camera lens 225 receives the photons of all of the wavelengths and transmits the photons to camera 230. Camera 230 compiles the photons into a thermal image representative of the thermal radiation emitted from the linear segment of moving component 202. In the exemplary embodiment, camera 230 is an IR camera with broadband sensitivity, e.g. an Indium Gallium Arsenide (InGaAs) sensor for wavelengths between 0.9-1.7 µm (900-1, 700 nm). In other embodiments, a video camera or other cameras are used to capture the photons. In some embodiments, as moving component 202 moves in direction 205, optical system 200 receives a continuous stream of photons from moving component 202 to be compiled into one image. In other embodiments, optical system 200 receives photons from different sections of moving component 202 every time that moving component 202 passes by, like a snapshot. The photons from each section are compiled into one image.

Optical system 200 forms three optical conjugate planes. The first plane is the object under test, e.g., the surface of moving component 202. The other two planes are the slit, e.g., view limited device 215, and camera 230. One skilled in the art will realize that the actual implementation may change due to conditions, i.e., temperatures, and equipment used, i.e., sensor sizes and types.

In one embodiment, a sight tube or boroscope is inserted into wall 218 to collect photons at the inner lining of wall 218. This embodiment includes a camera enclosure (not shown) which protects camera 230 from the harsh conditions and is potentially purged with clean, cool air. The camera enclosure is located outside of wall 218. In this embodiment, camera enclosure also includes dispersive element 220 and camera lens 225.

In another embodiment, a viewing port is placed in wall 218 allowing unobstructed viewing. In this embodiment, lens element 210 is located outside of wall 218 and focuses the photons onto view limiting device 215. In this embodiment, both lens element 210 and view limiting device 215 are included in the camera enclosure.

In yet another embodiment, camera 230 may be ruggedized such that optical system 200 is within the hot gas path and in between wall 218 and moving component 202. In this embodiment, optical system 200 is in a camera enclosure that includes lens element 210, view limiting device 215, dispersive element 220, camera lens 225, and camera 230. In this embodiment, camera enclosure provides reliable environmental protection from the conditions in the hot gas path. In this embodiment, view limiting slit 215 is configured to limit the photons that pass between lens element 210 and dispersive element 220 to a portion of the emitted thermal radiation.

Figure 3:
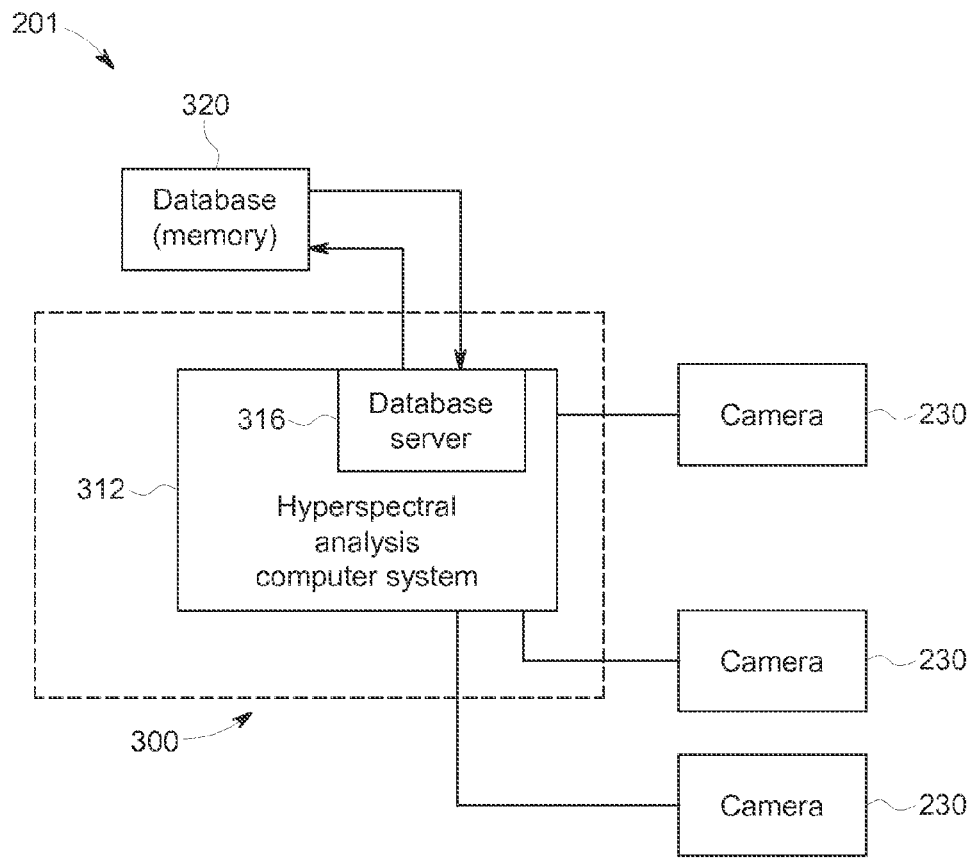
FIG. 3 is a general schematic diagram of an exemplary image processing system integrated into the hyperspectral imaging system shown in FIG. 2.

FIG. 3 is a general schematic diagram of an image processing system 300 integrated into hyperspectral imaging system 201 shown in FIG. 2. In the exemplary embodiment, image processing system 300 is used for compiling and analyzing thermal images from a plurality of cameras 230. Hyperspectral imaging system 201 includes image processing system 300. Image processing system 300 includes a hyperspectral analysis (HA) computer system 312 that is in communication with cameras 230. Cameras 230 connect to HA computer system 312 through many interfaces including without limitation a network, such as a local area network (LAN) or a wide area network (WAN), dial-in-connections, cable modems, Internet connection, wireless, and special high-speed Integrated Services Digital Network (ISDN) lines. HA computer system 312 collects thermal images from cameras 230. In the exemplary embodiment, each camera 230 transmits a thermal image, divided into multiple wavelengths, of a different component or view. In other embodiments, each camera only transmits images derived from photons of one wavelength or a range of wavelengths and HA computer system 312 combines the different images from the different cameras 230 into one image. In other embodiments, HA computer system 312 is connected to only one camera 230.

In some embodiments, HA computer system 312 instructs cameras 230 when to take thermal images of moving component 202 (shown in FIG. 2). For example, in some embodiments, HA computer system 312 knows the speed at which moving component 202 is travelling. With that information, HA computer system 312 instructs camera 230 to transmit thermal images of moving component 202 every time moving component 202 travels past camera 230. In some embodiments, HA computer system 312 compiles the received thermal images into a larger image of moving component 202. In other embodiments, HA computer system 312 compares the thermal images received at different times to determine the changes in moving component 202 over time or under different conditions and operational states.

A database server 316 is coupled to database 320, which contains information on a variety of matters, as described below in greater detail. In one embodiment, centralized database 320 is stored on HA computer system 312. In an alternative embodiment, database 320 is stored remotely from server system 312 and may be non-centralized. In some embodiments, database 320 includes a single database having separated sections or partitions or in other embodiments, database 320 includes multiple databases, each being separate from each other. Database 320 stores image data received from multiple cameras 230. In addition, database 320 stores analyzed images, component data, equations, and historical data generated as part of collecting image data from multiple cameras 230 viewing multiple components.

Figure 4:
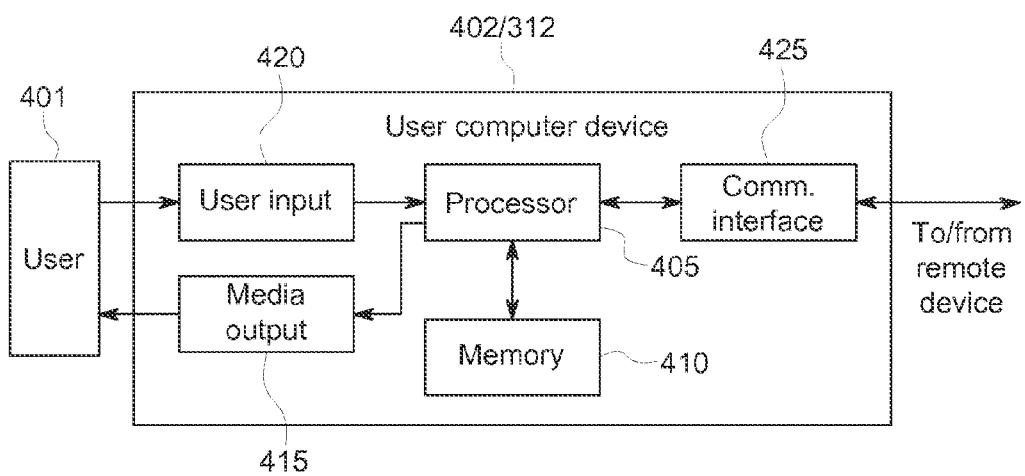
FIG. 4 illustrates an exemplary configuration of the hyperspectral analysis (HA) computer system shown in FIG. 3.

FIG. 4 illustrates an exemplary configuration of HA computer system 312 shown in FIG. 3. More specifically, computing device 402, which may be HA computer system 312, monitors and controls any camera 230 (shown in FIG. 2). Computing device 402 includes a memory device 410 and a processor 405, also known as a processing device, operatively coupled to memory device 410 for executing instructions. In some embodiments, executable instructions are stored in memory device 410. Computing device 402 is configurable to perform one or more operations described herein by programming processor 405. For example, processor 405 may be programmed by encoding an operation as one or more executable instructions and providing the executable instructions in memory device 410. In the exemplary embodiment, memory device 410 is one or more devices that enable storage and retrieval of information such as executable instructions and other data. Memory device 410 may include one or more computer readable media.

Memory device 410 may be configured to store operational measurements including, without limitation, real-time and historical voltage and current values, and any other type data. Also, memory device 410 includes, without limitation, sufficient data, algorithms, and commands to facilitate analyzing thermal images provided by cameras 230 and controlling the operation of those cameras 230.

In some embodiments, computing device 402 includes a media output 415 coupled to processor 405. Media output 415 presents information, such as a user interface or an alarm, to a user 401. In some embodiments, media output 415 includes one or more display devices. In some embodiments, media output 415 presents thermal image data associated with a component, such as by using a human machine interface (not shown). Also, in some embodiments, computing device 402 includes a user input 420. In the exemplary embodiment, user input 420 is coupled to processor 405 and receives input from user 401.

A communication interface 425 is coupled to processor 405 and is configured to be coupled in communication with one or more other devices, such as a sensor or another computing device 402, and to perform input and output operations with respect to such devices while performing as an input channel. Communication interface 425 receives data from and transmit data to one or more remote devices. For example, a communication interface 425 of one computing device 402 transmits image data to the communication interface 425 of another computing device 402.

Figure 5:
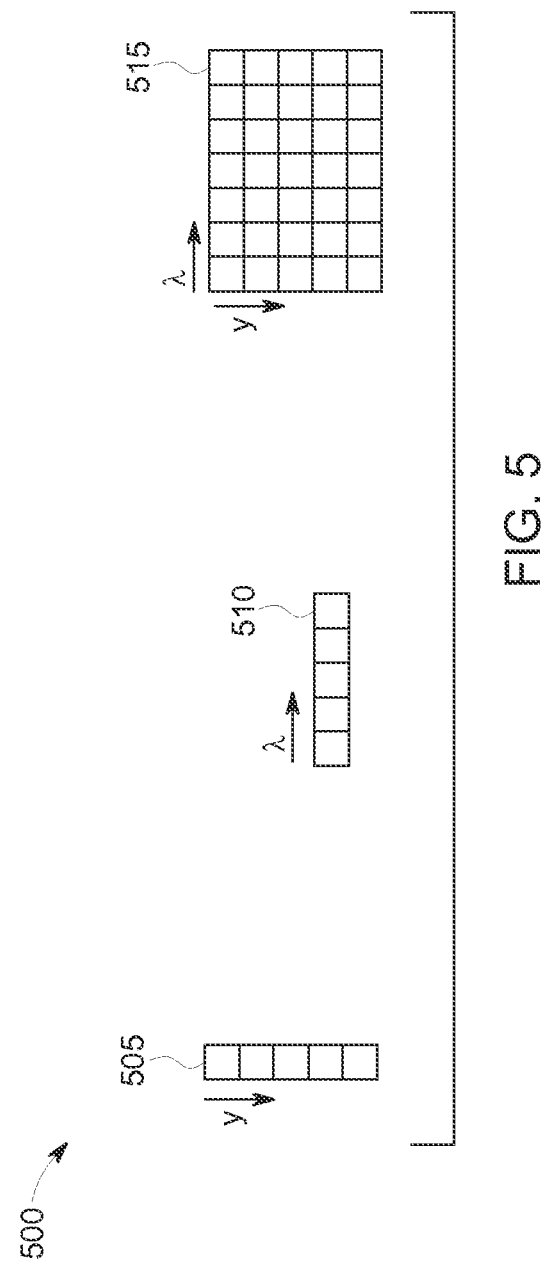
FIG. 5 illustrates the image data collected by the optical system shown in FIG. 2.

FIG. 5 illustrates the image data 500 collected by the optical system 200 shown in FIG. 2. A vertical one-dimensional (1D) array 505 displays the thermal points that constitute the linear segment, where each box represents one thermal point. Vertical 1D array 505 is one wavelength ($\lambda$) wide by y thermal points long. A horizontal 1D array 510 contains the spectral content of the radiation from each point. Horizontal 1D array 510 represents the plurality of wavelength points that correspond to one thermal point. Each box displayed in horizontal 1D array 510 represents one wavelength point. A two-dimensional (2D) array 515 displays the complete spectrum for the linear segment. The y direction displays the thermal points and the $\lambda$ direction displays the wavelengths, or wavelength points associated with those thermal points giving wide spectral information over a line of an object. In addition to giving line rather than point data—and extending this to 2D data through utilizing turbine rotation—this method provides much richer spectral data to handle challenges such as gas and soot emissions and non-constant emissivity.

Hyperspectral imaging system 201 uses conventional optics that deliver an image of the target onto a slit. The slit is followed by an additional focusing system that also incorporates a dispersive element such as a grating or prism. This second system projects an image of the slit onto a 2D array, e.g. an InGaAs SWIR sensor. The sensor as well as the grating or prism are aligned so that one axis is parallel with the slit and will record a spatial coordinate on the object. The orthogonal direction will record the spectral content of the radiation from each point. Hyperspectral imaging system 201 is oriented so that the natural movement of the blades will scan the image projected onto the slit, allowing a wide area to be covered during the revolution of the blade.

Figure 6:
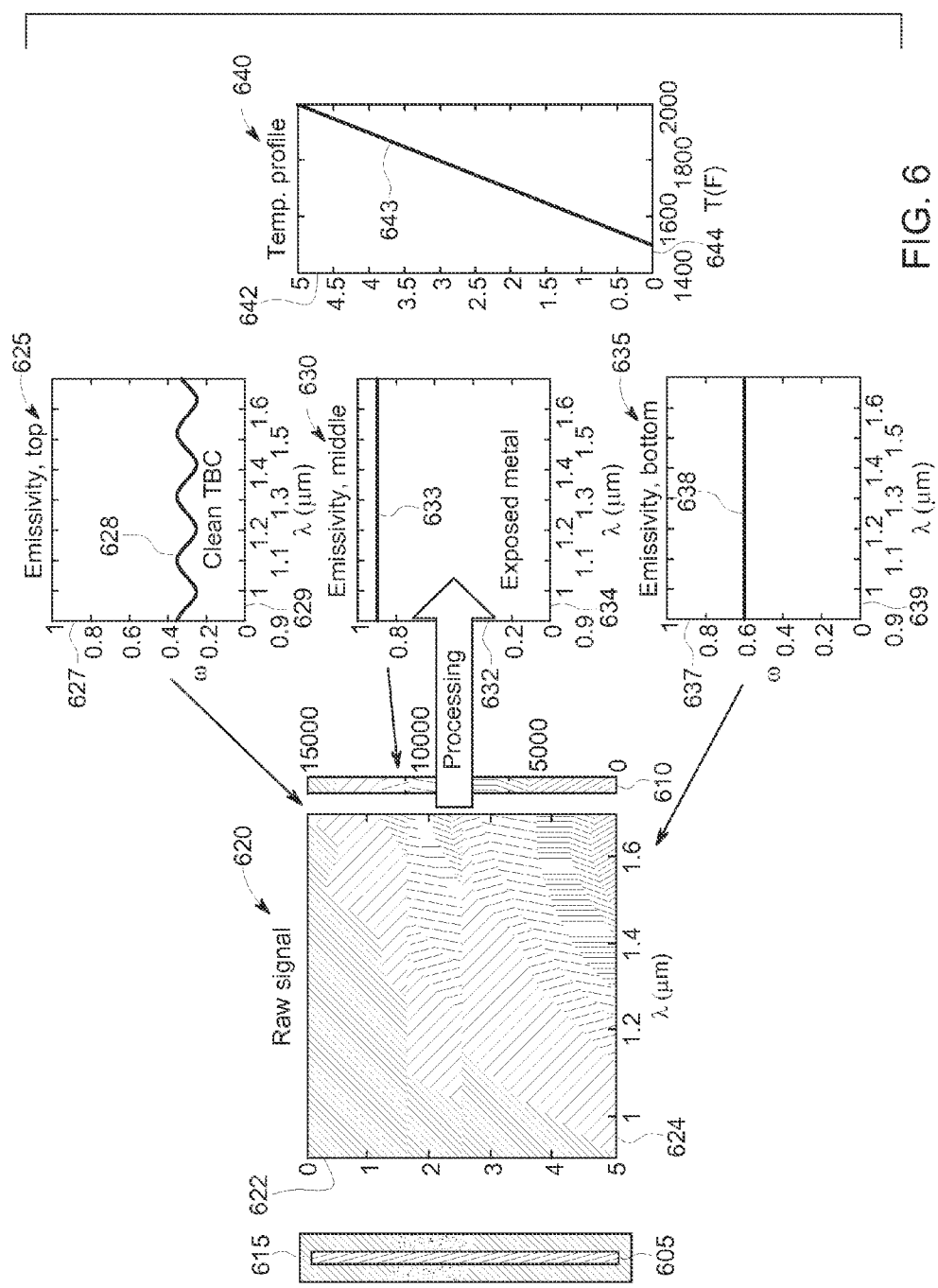
FIG. 6 illustrates the processing performed by the HA computer system in compiling the wavelengths provided by a camera of the thermal image of the component using the hyperspectral imaging system shown in FIGS. 2 and 3.

FIG. 6 illustrates the processing performed by HA computer system 312 (shown in FIG. 3) in compiling the wavelengths provided by camera 230 (shown in FIG. 2) of the thermal image of the component 202 (shown in FIG. 2) using hyperspectral imaging system 201 (shown in FIGS. 2 and 3). A plurality of photons 605 are transmitted through a slit 615, for example view limiting device 215 shown in FIG. 2, to one or more cameras 230 (also shown in FIG. 2). A slit image 610 illustrates the linear view of the component as a line of thermal points, shown on a scale of 0 to 5. Raw signal 620 displays slit image 610 divided by wavelength (λ). Y-axis 622 represents distance in increments of 1 thermal point extending from 5 to 0. X-axis 624 represents wavelength in increments of 0.2 micrometer (μm) extending from 0.9 μm to 1.7 μm. In this exemplary embodiment, each thermal point shown in slit image 610 has been divided to show the wavelengths between 0.9 μm and 1.7 μm.

A temperature profile 640 displays a graph of the temperatures of the surface of the component as calculated from the wavelengths in raw signal 620. Y-axis 642 represents distance in increments of 0.5 thermal points extending from 0 to 5. X-axis 644 represents temperature in increments of 200 degrees Fahrenheit (F) extending from 1400 F to 2000 F. Curve 643 represents the temperature of any point along the linear segment of the component.

Three emissivity graphs 625, 630, and 635 display the calculated emissivity of the top, middle, and bottom of the linear segment, respectively. Y-axes 627, 632, and 637 of the three emissivity graphs 625, 630, and 635, respectively, represent emissivity in unitless increments of 0.2 extending from 0 to 1. X-axes 629, 634, and 639 represent wavelength in increments of 0.2 μm extending from 0.9 μm to 1.7 μm. Curves 628, 633, and 638 represent the emissivity of the top, bottom and middle portion of raw signal 620, respectively.

In this exemplary embodiment, curves 628 and 638 display emissivity within acceptable parameters. Curve 633 displays a relatively high emissivity compared to the other two graphs, which in the exemplary embodiment indicates that the coating is missing at that point on the component. As seen in raw signal 620, the wavelengths for the middle section have a distinctly different pattern than the continuous pattern shown in the rest of raw signal 620. In this exemplary embodiment, the difference in patterns indicates that the thermal properties of this section are different from those of the rest of the linear segment.

In the exemplary embodiment, radiance temperature is determined at several wavelengths. By collecting radiance temperature at several wavelengths, a temperature and emissivity solution can be obtained, as shown in the three emissivity graphs 625, 630, and 635, and temperature profile 640. These solutions may be obtained by solving a linear equation using the least squares method or another iterative algorithm. For this embodiment, the following function can be used:

$$\ln [\epsilon^{\textit{effective}}(\lambda)] = a + b\lambda$$

Where a and b are calibration constants and λ is the wavelength. This equation can be expressed in a common form as:

$$-\frac{1}{TR} = -\frac{1}{T} + \frac{a}{C2}\lambda + \frac{b}{C2}\lambda^2$$

Where T is temperature, TR is radiance temperature, C2 is Plank's second constant, a and b are calibration constants, and λ is the wavelength.

Figure 7:
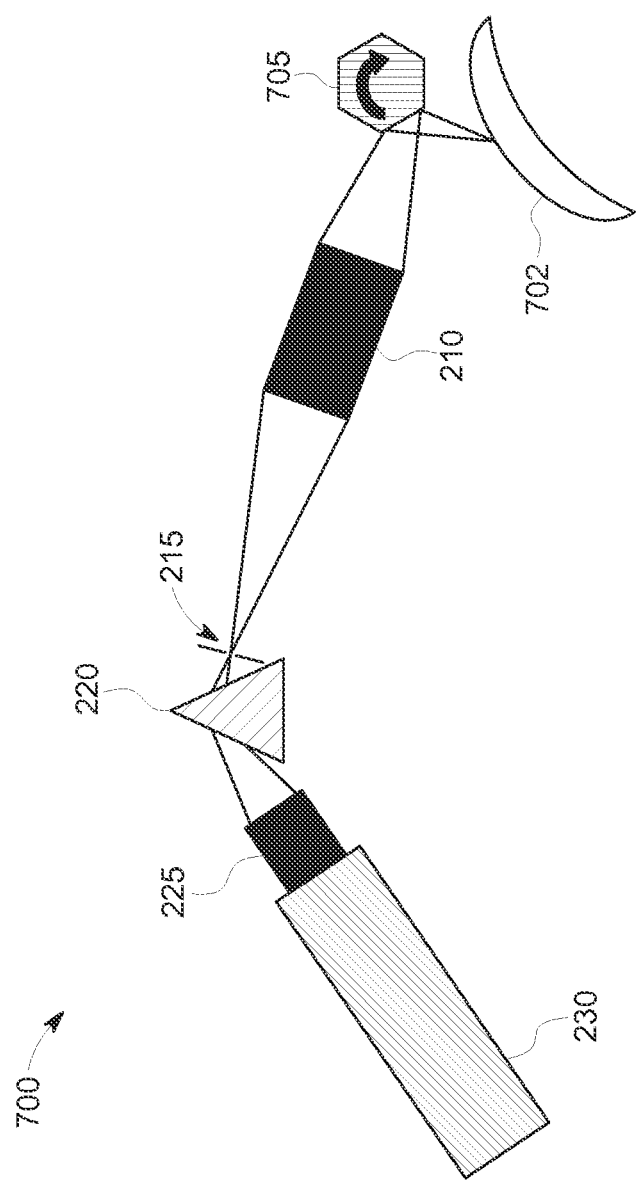
FIG. 7 is a schematic top view of an exemplary optical system for a hyperspectral imaging system scanning a stationary component that may be used with the gas turbine engine shown in FIG. 1.

FIG. 7 is a schematic top view of an exemplary optical system 700 for hyperspectral imaging system 201 (shown in FIG. 2) scanning a stationary component 702 that may be used with the gas turbine engine 100 shown in FIG. 1. In some embodiments, stationary component 702 could be stationary vane assembly 123, fuel nozzle assembly 118, stationary nozzle assembly 125, or combustor 116 (all shown in FIG. 1). Optical system 700 includes one or more scanning optics 705. Scanning optic 705 reflects photons emitted from stationary component 702. Scanning optic 705 is configured to reflect photons from multiple sections of stationary component 702 to lens element 210. As described above in the description of FIG. 2, lens element 210 focuses and transmits the reflected photons through view limiting device 215 to dispersive element 220. Dispersive element divides the photons by wavelength and transmits the photons to camera lens 225 and camera 230. Camera 230 compiles the photons into a thermal image representative of the thermal radiation emitted from stationary component 702. HA computer system 312 (shown in FIG. 3) compiles thermal images from camera 230 of multiple sections to display a large portion or the entire surface of stationary component 702.

Figure 8:
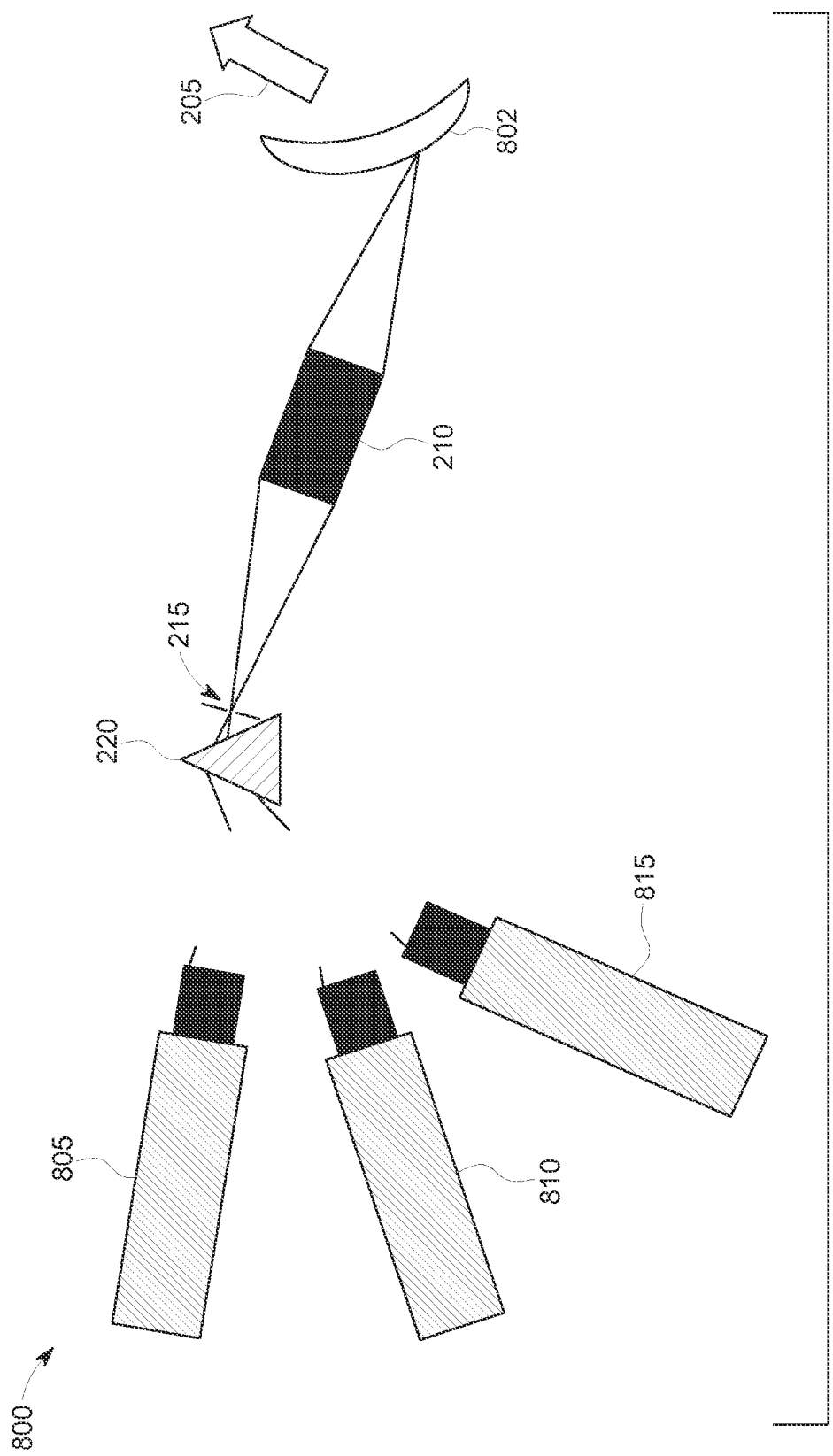
FIG. 8 is a schematic top view of an alternative optical system for a hyperspectral imaging system scanning a component using multiple cameras that may be used with the gas turbine engine shown in FIG. 1.

FIG. 8 is a schematic top view of an alternative optical system 800 for hyperspectral imaging system 201 scanning a component 802 using multiple cameras that may be used with the gas turbine engine 100 shown in FIG. 1. In some alternative embodiments, instead of one camera 230 described in optical system 200 (both shown in FIG. 2) to receive photons of all of the wavelengths from dispersive element 220, alternative optical system 800 includes multiple cameras 805, 810, and 815. Camera λ1 805, camera λ2 810, and camera λ3 815 each receive a photons from different wavelengths or a different range of wavelengths. HA computer system 312 (shown in FIG. 3) compiles the photons from the different cameras 805, 810, and 815 to create raw signal 620, shown in FIG. 6. In another embodiment, instead of having each camera 805, 810, and 815 receive photons from different wavelengths, each camera receives photons from different thermal point or series of thermal points on component 802.

Figure 9:
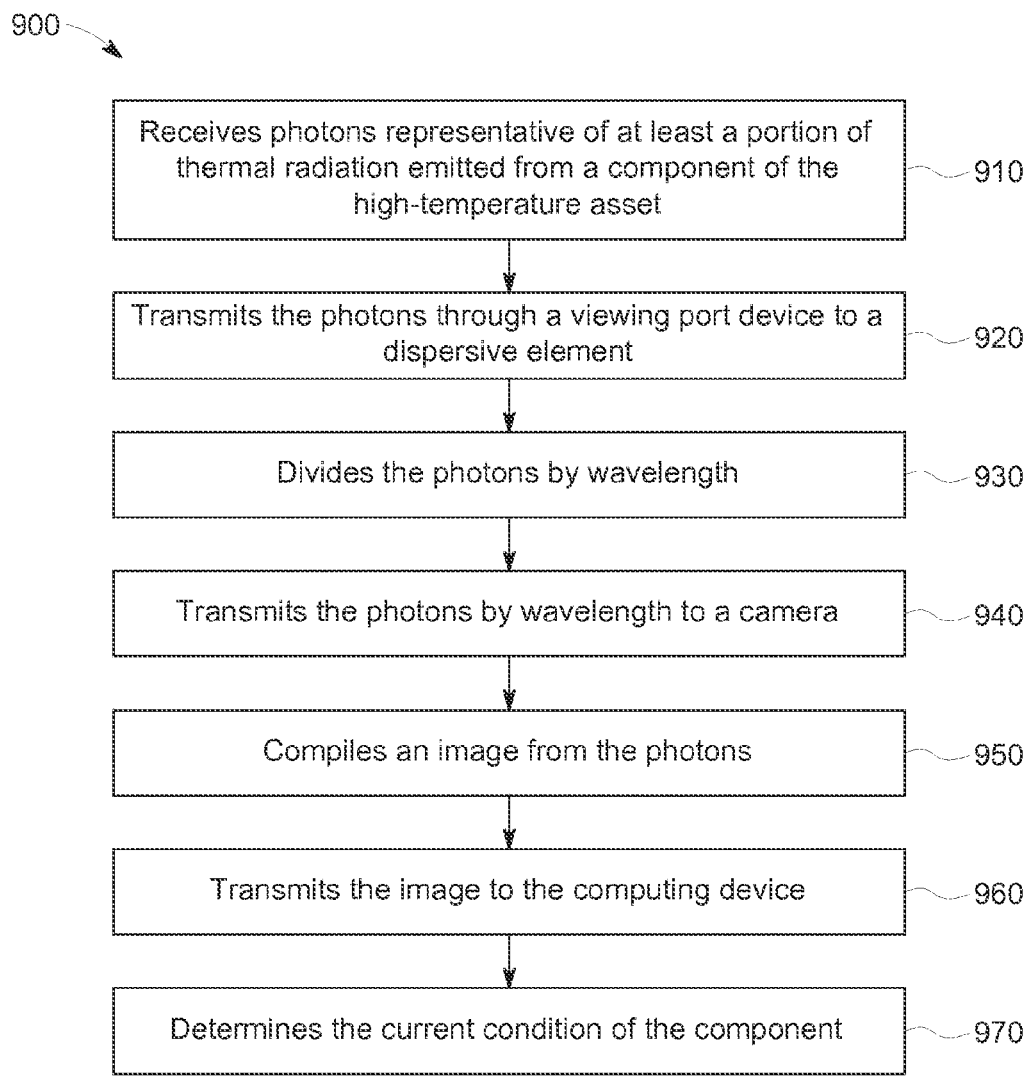
FIG. 9 is a flow chart of an exemplary method for collecting thermal images from a component in a high-temperature asset using the hyperspectral imaging system shown in FIGS. 2 and 3.

FIG. 9 is a flow chart of an exemplary method 900 for collecting thermal images from a component in a high-temperature asset using the hyperspectral imaging system 201 shown in FIGS. 2 and 3. Lens element 210, shown in FIG. 2, receives 910 photons representative of at least a portion of thermal radiation emitted from component 202 (shown in FIG. 2) of the high-temperature asset. Lens element 210 transmits 920 the received photons through view limiting device 215 to dispersive element 220 (both shown in FIG. 2). Dispersive element 220 splits 930 the received photons by wavelength. Dispersive element 220 transmits 940 photons by wavelengths to camera 230 (shown in FIG. 2). Camera 230 (shown in FIG. 2) compiles a thermal image from the photons and transmits 950 thermal image to HA computer system 320, shown in FIG. 3. HA computer system 320 determines, based on thermal image, the current condition of component 202. This determination may be used to predict when maintenance needs to be performed on the component or to predict when the component needs to be replaced due to a high likelihood of failure.

The above-described systems and methods provide a cost-effective method for increasing reliability and decreasing disruptions of operation of gas turbine engines and other high-temperature systems. Specifically, systems and methods described herein receive photons representative of the thermal radiation emitted from a component in a high-temperature area of a high-temperature asset. Also, the systems and methods described herein divide the photons into ranges of wavelengths. Further, the systems and methods described herein compile the photons from the different wavelengths into a thermal image showing the wavelengths of the radiation emitted from the component. Moreover, the systems and methods described herein analyze the thermal image to determine the surface temperature of the component. In addition, the systems and methods described herein also use the thermal image and the determined temperatures to determine the emissivity and the status of a thermal coating on the component. Furthermore, the systems and methods described herein are configured so that the natural movement of the component will allow the system to scan multiple continuous linear sections of the component. Also, the systems and methods described herein may also be configured to scan a non-moving component.

An exemplary technical effect of the methods, systems, and apparatus described herein includes at least one of: (a) receiving photons representative of thermal radiation from multiple points on the surface of a component operating in a high-temperature asset; (b) dividing the received photons by wavelength for each point of the surface that thermal radiation is received from; (c) combining the received photons into a thermal image of the multiple points on the surface of the component; (d) accurately determining the temperature at each of the multiple points on the component from the different wavelengths of photons; (e) determining the emissivity and the status of the thermal coating on the component for each of the multiple points from the different wavelengths of photons; and (f) determining the current condition of the component.

Exemplary embodiments of systems and methods for collecting data from multiple operable system devices are described above in detail. The systems and methods described herein are not limited to the specific embodiments described herein, but rather, components of systems or steps of the methods may be utilized independently and separately from other components or steps described herein. For example, the methods may also be used in combination with other extreme temperature systems requiring thermal imaging systems and methods, and are not limited to practice with only gas turbine engine as described herein. Rather, the exemplary embodiments may be implemented and utilized in connection with many other data collection applications.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), or any other circuit or processor capable of executing the functions described herein. The methods described herein may be encoded as executable instructions embodied in a computer readable medium, including, without limitation, a storage device or a memory device. Such instructions, when executed by a processor, cause the processor to perform at least a portion of the methods described herein. The above examples are exemplary only, and thus are not intended to limit in any way the definition or meaning of the term processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A pyrometry imaging system for monitoring a high-temperature asset, which includes at least one component, said system comprising:
    a lens element in optical communication with the at least one component, said lens element configured to receive at least a portion of thermal radiation emitted from a plurality of thermal points of the at least one component, wherein each thermal point of the plurality of thermal points defines a section of the at least one component;
    a view limiting device in optical communication with said lens element;
    a dispersive element in optical communication with said lens element through said view limiting device, said view limiting device positioned between said lens element and said dispersive element, said dispersive element configured to split the at least a portion of thermal radiation emitted into a plurality of wavelength points for each of the plurality of thermal points, wherein each wavelength point of the plurality of wavelength points represents a wavelength of the at least a portion of thermal radiation emitted from the corresponding thermal point; and
    at least one camera device in optical communication with said dispersive element, said at least one camera device configured to receive at least some wavelength points of the plurality of wavelength points from said dispersive element;
    at least one processor in communication with said at least one camera device, said at least one processor programmed to:
    receive a stream of signals generated by said at least one camera device substantially representative of the plurality of wavelength points corresponding to each thermal point of the plurality of thermal points; and
    generate a two-dimensional array based on the stream of signals, wherein a first dimension of the two-dimensional array represents the plurality of thermal points and a second dimension of the two-dimensional array represents the plurality of wavelength points corresponding to a thermal point of the plurality of thermal points.

2. The system in accordance with claim 1, wherein said view limiting device defines a slit having a predetermined alignment with said dispersive element and said lens element, said view limiting device configured to limit the portion of thermal radiation emitted transmitted from said lens element to said dispersive element as a function of the predetermined alignment of the slit.

3. The system in accordance with claim 1, wherein the at least one component is moving relative to said lens element.

4. The system in accordance with claim 1 further comprising a scanning optic device in optical communication with the at least one component, wherein said scanning optic device configured to:
receive the at least a portion of thermal radiation emitted from the plurality of thermal points of the at least one component, wherein the at least one component is stationary relative to said lens element; and
transmit the at least a portion of thermal radiation emitted to said lens element.

5. The system in accordance with claim 1, wherein said at least one camera device comprises a plurality of camera devices comprising:
a first camera device configured to receive at least one wavelength point of the plurality of wavelength points corresponding to a first wavelength; and
a second camera device configured to receive at least one wavelength point of the plurality of wavelength points corresponding to a second wavelength.

6. The system in accordance claim 1, wherein said at least one processor further programmed to determine an emissivity of the at least one of the plurality of thermal points of the at least one component at least partially based on the stream of signals.

7. The system in accordance with claim 6, wherein said at least one processor further programmed to determine a status of a coating of the at least one of the plurality of thermal points of the at least one component based on the determined emissivity.

8. The system in accordance with claim 1, wherein said at least one camera device further configured to receive a plurality of views of the at least one component, wherein each view comprises a different plurality of thermal points of the at least one component.

9. The system in accordance with claim 1, wherein the high-temperature asset is a gas-turbine engine, and wherein the at least one component is at least one of a bucket, a blade, a vane, a nozzle, and a combustor.

10. A method for operating a pyrometry imaging system for monitoring a high-temperature asset which includes at least one component, said method comprising:
receiving, by a lens element, a portion of thermal radiation emitted from a plurality of thermal points of the at least one component, wherein each thermal point of the plurality of thermal points defines a section of the at least one component;
transmitting, from the lens element, the portion of thermal radiation emitted through a view limiting device to a dispersive element;
splitting, by the dispersive element, the portion of thermal radiation emitted into a plurality of wavelength points for each of the received thermal points, wherein each wavelength point of the plurality of wavelength points represents a wavelength of the portion of thermal radiation emitted from the corresponding thermal point;
transmitting, by the dispersive element, at least some wavelength points of the plurality of wavelength points to at least one camera device; and
generating, at the at least one camera device, a stream signals substantially representative of the plurality of wavelength points corresponding to each thermal point of the plurality of thermal points; and
generating a two-dimensional array based on the stream of signals, wherein a first dimension of the two-dimensional array represents the plurality of thermal points and a second dimension of the two-dimensional array represents the plurality of wavelength points corresponding to a thermal point of the plurality of thermal points.

11. The method in accordance with claim 10, wherein the at least one view limiting device defines a slit having a predetermined alignment with the at least one dispersive element and the at least one lens element, and wherein transmitting the portion of thermal radiation emitted further comprises limiting, by the view limiting device as a function of the predetermined alignment of the slit.

12. The method in accordance with claim 10 further comprising determining, by the processor, an emissivity of the at least one of the plurality of thermal points of the at least one component at least partially based on the stream of signals.

13. The method in accordance with claim 12 further comprising determining, by the processor, a status of a coating of the at least one of the plurality of thermal points of the at least one component based on the determined emissivity.

14. A high-temperature asset defining at least one high-temperature region, said asset comprising:
at least one component positioned in the high-temperature region of said high-temperature asset; and
a pyrometry imaging system comprising:
a lens element in optical communication with said at least one component, wherein said lens element configured to receive at least a portion of thermal radiation emitted from a plurality of thermal points from said at least one component, wherein each thermal point of the plurality of thermal points defines a section of the at least one component;
a view limiting device in optical communication with said lens element;
a dispersive element in optical communication with said lens element through said view limiting device, said view limiting device positioned between said lens element and said dispersive element, said dispersive element configured to split the at least a portion of thermal radiation emitted into a plurality of wavelength points for each of the plurality of thermal points, wherein each wavelength point of the plurality of wavelength points represents a wavelength of the at least a portion of thermal radiation emitted from the corresponding thermal point; and
at least one camera device in optical communication with said dispersive element, said at least one camera device configured to receive at least some wavelength points of the plurality of wavelength points from the dispersive element;
at least one processor in communication with said at least one camera device, wherein said at least one processor programmed to:
receive a stream of signals generated by said at least one camera device substantially representative of the plurality of wavelength points corresponding to each thermal point of the plurality of thermal points; and
generate a two-dimensional array based on the stream of signals, wherein a first dimension of the two-dimensional array represents the plurality of thermal points and a second dimension of the two-dimensional array represents the plurality of wavelength points corresponding to a thermal point of the plurality of thermal points.

15. A high-temperature asset in accordance with claim 14, wherein said at least one processor programmed to:

determine an emissivity of at least one of the plurality of thermal points of the at least one component at least partially based on the stream of signals; and determine a status of a coating of the at least one of the plurality of thermal points of the at least one component based on the determined emissivity.

\* \* \* \* \*